US009961305B2

(12) United States Patent
Guo et al.

(10) Patent No.: US 9,961,305 B2
(45) Date of Patent: May 1, 2018

(54) METHOD AND SYSTEM FOR VIDEO STITCHING

(71) Applicant: HANGZHOU HIKVISION DIGITAL TECHNOLOGY CO., LTD., Hangzhou (CN)

(72) Inventors: Bin Guo, Hangzhou (CN); Xing Shi, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days. days.

(21) Appl. No.: 14/890,263

(22) PCT Filed: Nov. 21, 2014

(86) PCT No.: PCT/CN2014/091829
§ 371 (c)(1),
(2) Date: Nov. 10, 2015

(87) PCT Pub. No.: WO2015/139471
PCT Pub. Date: Sep. 24, 2015

(65) Prior Publication Data
US 2016/0112676 A1    Apr. 21, 2016

(30) Foreign Application Priority Data

Mar. 20, 2014  (CN) .......................... 2014 1 0104497

(51) Int. Cl.
*H04N 7/18* (2006.01)
*H04N 5/262* (2006.01)
(Continued)

(52) U.S. Cl.
CPC ............. *H04N 7/18* (2013.01); *G06T 3/4038* (2013.01); *G06T 3/60* (2013.01); *G06T 5/50* (2013.01);
(Continued)

(58) Field of Classification Search
None
See application file for complete search history.

(56) References Cited

U.S. PATENT DOCUMENTS

| 5,619,255 A | * | 4/1997 | Booth | H04N 5/2251 348/36 |
| 5,672,866 A | * | 9/1997 | Messina | G01C 11/02 250/236 |

(Continued)

FOREIGN PATENT DOCUMENTS

| CN | 101021678 A | 8/2007 |
| CN | 101146231 A | 3/2008 |

(Continued)

OTHER PUBLICATIONS

International Search Report from International Application No. PCT/CN2014/091829 dated Mar. 2, 2015.

(Continued)

*Primary Examiner* — Michelle Hausmann
*Assistant Examiner* — Michelle Entezari
(74) *Attorney, Agent, or Firm* — Marshall, Gerstein & Borun LLP

(57) ABSTRACT

Disclosed are a method and a system for video stitching. After it is determined that initial mounting of cameras in a M×N video stitching scene is completed, a reference image is selected from M×N images corresponding to M×N cameras; where both M and N are positive integers, at least one of M and N is larger than 1, and a rotating mirror is set in front of a camera lens of each camera; an image whose position does not meet a requirement among respective images except for the selected reference image is adjusted by controlling a rotating mirror corresponding to the image (Continued)

to rotate according to the selected reference image; and video stitching is performed according to an adjustment result.

14 Claims, 7 Drawing Sheets

(51) Int. Cl.
  *G06T 3/40*  (2006.01)
  *G06T 3/60*  (2006.01)
  *G06T 5/50*  (2006.01)
  *H04N 5/247*  (2006.01)

(52) U.S. Cl.
  CPC ............ *H04N 5/247* (2013.01); *H04N 5/262* (2013.01); *H04N 5/2622* (2013.01); *G06T 2200/32* (2013.01); *G06T 2207/30232* (2013.01)

(56) References Cited

U.S. PATENT DOCUMENTS

| | | | | |
|---|---|---|---|---|
| 6,665,003 B1 * | 12/2003 | Peleg | ................... | G06T 3/4038 348/36 |
| 7,551,756 B2 * | 6/2009 | Chupeau | ............ | G06K 9/00228 348/77 |
| 8,200,039 B2 | 6/2012 | Jin et al. | | |
| 8,442,661 B1 * | 5/2013 | Blackwell | .............. | B25J 9/1689 700/245 |
| 8,902,335 B2 * | 12/2014 | Doepke | ................. | G06T 3/4038 348/218.1 |
| 2003/0113035 A1 * | 6/2003 | Cahill | ...................... | G06T 3/00 382/284 |
| 2005/0025313 A1 * | 2/2005 | Wachtel | ................ | G06T 1/0007 380/54 |
| 2007/0091195 A1 * | 4/2007 | Yoshikawa | ............ | G02B 13/16 348/335 |
| 2008/0089606 A1 * | 4/2008 | Patnaik | ..................... | G06T 5/50 382/275 |
| 2009/0041368 A1 * | 2/2009 | Leberl | ...................... | G06T 5/50 382/254 |
| 2011/0249100 A1 | 10/2011 | Jayaram et al. | | |
| 2015/0193909 A1 * | 7/2015 | Maayan | .................... | G06T 3/20 345/648 |

FOREIGN PATENT DOCUMENTS

| | | |
|---|---|---|
| CN | 101281640 | 10/2008 |
| CN | 101404725 | 4/2009 |
| CN | 102620720 A | 8/2012 |
| CN | 103065470 | 4/2013 |
| CN | 103295209 | 9/2013 |
| WO | WO-2010/044913 | 4/2010 |

OTHER PUBLICATIONS

Office Action in CN Application No. 201410104497.1 dated May 27, 2017, 8 pages.
Extended European Search Report in EP Application No. 14886544.7 dated Jan. 25, 2017, 9 pages.

* cited by examiner

| Camera 1 | Camera 2 | Camera 3 |
| --- | --- | --- |
| Camera 4 | Camera 5 | Camera 6 |
| Camera 7 | Camera 8 | Camera 9 |

METHOD AND SYSTEM FOR VIDEO STITCHING

CROSS REFERENCE TO RELATED APPLICATIONS

The present application claims priority to Chinese Patent Application No. 201410104497.1, entitled "Method and System for Video Stitching," filed on Mar. 20, 2014, which is hereby incorporated by reference in its entirety.

TECHNICAL FIELD

The present disclosure relates to video surveillance system, particularly to a method and system for video stitching.

BACKGROUND

Video stitching is a technology to stitch several videos which have overlapped parts into a large-scale, high resolution, seamless video.

Traditional ways to realize video stitching mainly include:

1) A fixed number of cameras are fixed in a closed apparatus, the number of the cameras is at least two, and angles between the respective cameras are fixed; since in this way, the number and angles of the cameras are all fixed, for different scenes, the adaptability and flexibility is relatively poor.

2) Separate cameras are used and mounted respectively, and similarly, the number of the cameras is at least two, and the number and angles of the cameras may be selected according to requirements of real scenes; though in this way, the adaptability and flexibility is relatively good, the overall procedure of mounting and testing the cameras all need to be done manually, and after the procedure of mounting and testing is completed, if image positions of the cameras move due to vibration, wind and rain, etc., the cameras need to be tested again, which is troublesome to implement, and costs a great amount of manpower and time.

SUMMARY

In view of this, the present disclosure provides a method and system for video stitching, which has relative adaptability and flexibility, and can reduce manpower and time costs.

To achieve the object, the technical solution of the present disclosure is as follows.

A method for video stitching includes:

selecting a reference image from M×N images corresponding to M×N cameras in a M×N video stitching; where both M and N are positive integers, at least one of M and N is larger than 1, and a rotating mirror is set in front of a camera lens of each camera;

adjusting an image whose position does not meet a requirement among respective images except for the selected reference image by controlling a rotating mirror corresponding to the image to rotate according to the selected reference image; and performing video stitching.

A system for video stitching, includes:

M×N cameras and a remote control apparatus; where both M and N are positive integers, at least one of M and N is larger than 1, and a rotating mirror is set in front of a camera lens of each camera; and the remote control apparatus is configured to, select a reference image from M×N images corresponding to the M×N cameras in a M×N video stitching scene; adjust an image whose position does not meet a requirement among respective images except for the selected reference image by controlling a rotating mirror corresponding to the image to rotate according to the selected reference image; and perform video stitching.

It can be seen that by using the technical solution of the present disclosure, once the initial mounting of cameras is completed, the subsequent test work may be carried out automatically. Meanwhile, if an image position moves due to variation or wind and rain, the test can be completed automatically as well so as to save manpower and time costs. In addition, the number of cameras in the technical solution of the present disclosure may be adjusted flexibly, and the angles of the cameras may be flexibly adjusted by rotating mirrors. Therefore, the technical solution of the present disclosure is applicable to any kind of scene, i.e., the technical solution of the present disclosure having relatively good adaptability and flexibility.

DETAILED DESCRIPTION

To make the technical solution of the present disclosure more clearly understood, the technical solution of the present disclosure will be further described in detail with reference to the accompanying drawings and embodiments.

Figure 1:
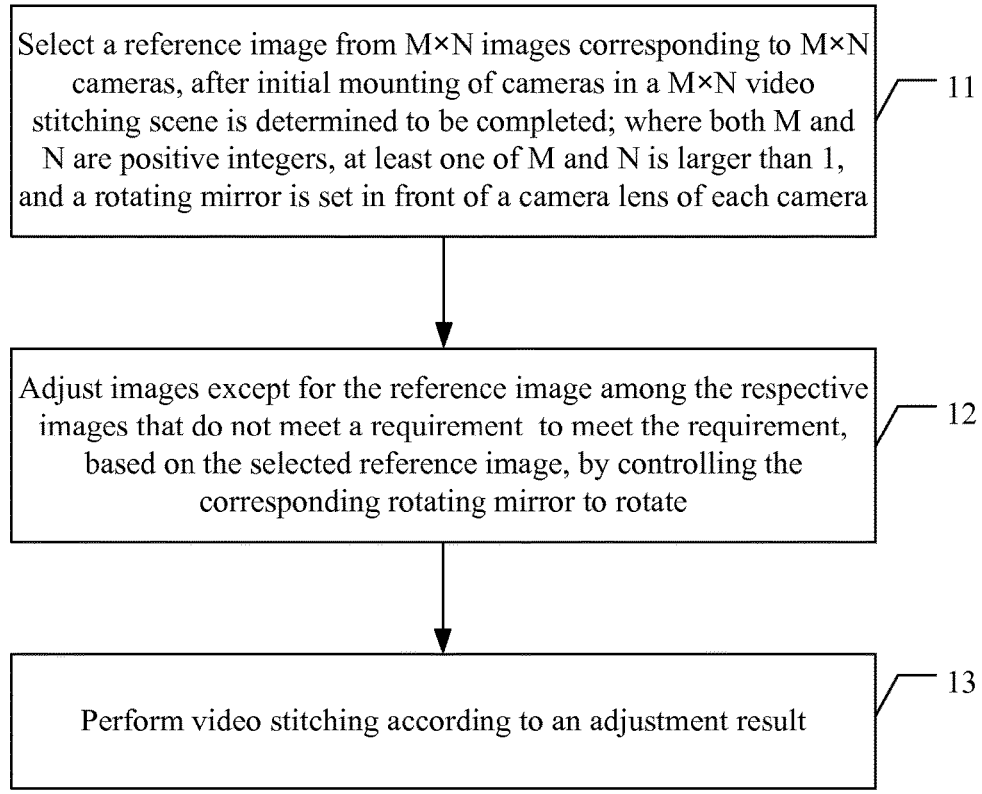
FIG. 1 is a flowchart of a method for video stitching according to embodiments of the present disclosure.

FIG. 1 is a flowchart of a method for video stitching according to embodiments of the present disclosure. As shown in FIG. 1, the method includes the following blocks 11-13.

Block 11: When it is determined that initial mounting of cameras in a M×N video stitching scene is completed, a reference image is selected from M×N images corresponding to M×N cameras; where both M and N are positive integers, at least one of M and N is larger than 1, and a rotating mirror is set in front of a camera lens of each camera.

Specific values for M and N can be determined according to practical needs.

The initial mounting may be carried out manually. Take a 1×3 video stitching scene as an example. Generally, the mounting heights of 3 cameras need to be almost the same, and fields of view of the 3 cameras are almost the same.

The respective cameras may be mounted separately. Preferably, a controllable rotating mirror may be set on the center axis of a camera lens of each camera, so as to cover an original field of view of the camera. How to set a rotating mirror and how to control the rotating mirror to rotate will not be limited herein, and any method that can be thought of by a person of ordinary skill in the art may be used.

Figure 2:
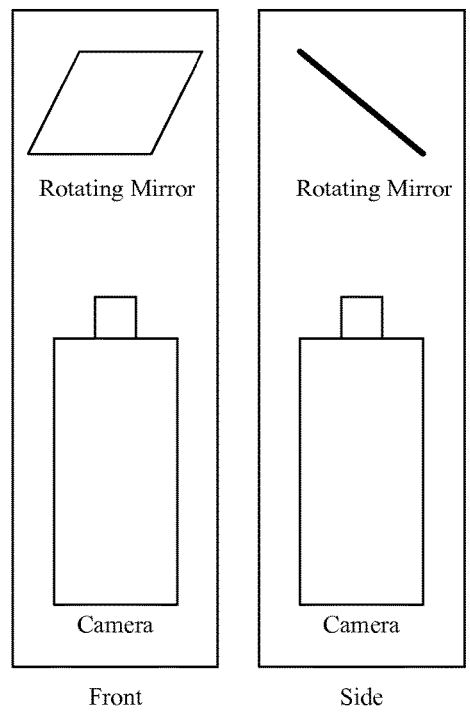
FIG. 2 is a schematic diagram of a front view and a side view of a camera and a rotating mirror according to embodiments of the present disclosure.

FIG. 2 is a schematic diagram of a front view and a side view of a camera and a rotating mirror according to the present disclosure. As shown in FIG. 2, a front view of the camera and the rotating mirror is on the left side, and a side view of the camera and the rotating mirror is on the right side.

Figure 3:
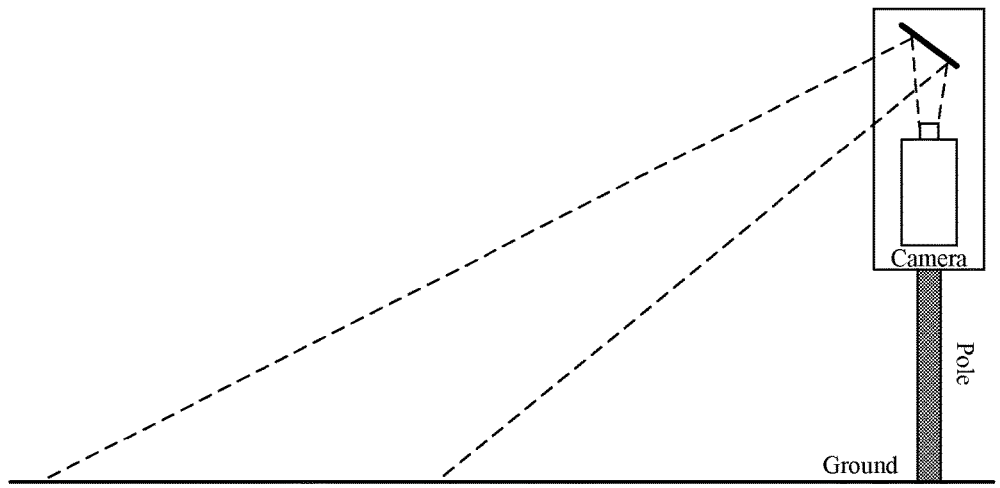
FIG. 3 is a schematic diagram of a way of mounting a camera according to embodiments of the present disclosure.

FIG. 3 is a schematic diagram of a way of mounting a camera according to the present disclosure. As shown in FIG. 3, in this way of mounting, installation of the camera is fixed all the time, but rotation of the rotating mirror may be controlled so that the field of view of the camera can navigate in a relatively large range.

Figure 4:
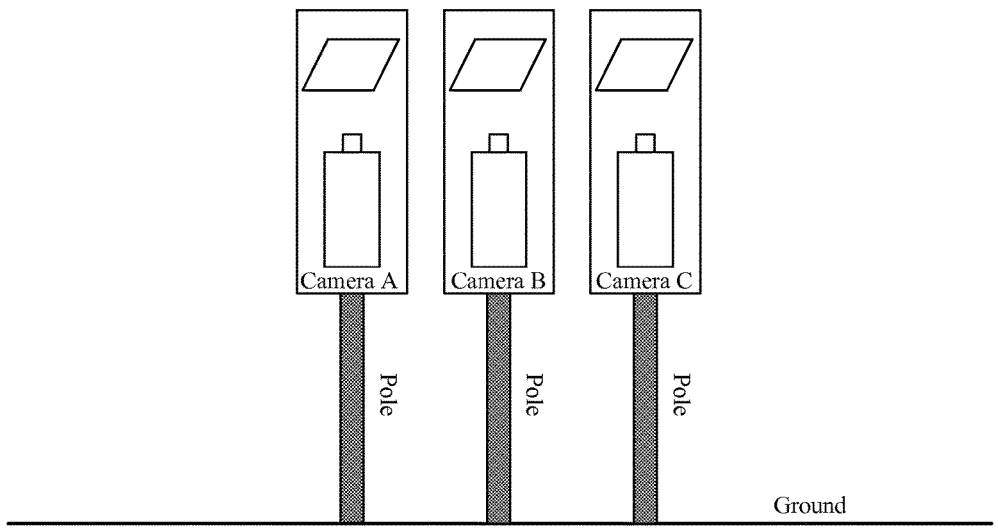
FIG. 4 is a schematic diagram of a front view of a way of mounting cameras in a 1×3 video stitching scene according to embodiments of the present disclosure.
Figure 5:
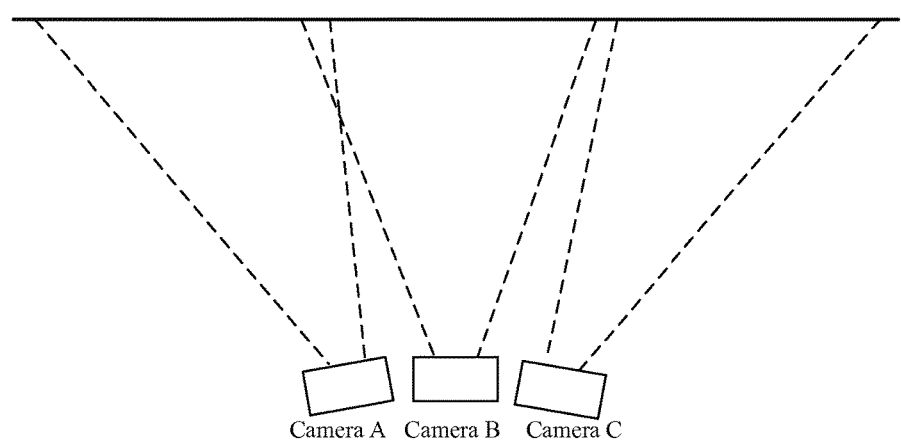
FIG. 5 is a schematic diagram of a top view of the way of mounting cameras in the 1×3 video stitching scene according to embodiments of the present disclosure.

FIG. 4 is a schematic diagram of a front view of a way of mounting cameras in a 1×3 video stitching scene according to the present disclosure. FIG. 5 is a schematic diagram of a top view of the way of mounting cameras in the 1×3 video stitching scene according to the present disclosure. As shown in FIG. 4 and FIG. 5, the 3 cameras from left to right are respectively camera A, camera B, and camera C.

After initial mounting of the cameras is completed, an image may be selected from M×N images corresponding to the M×N cameras as a reference image.

Figures 6, 7:
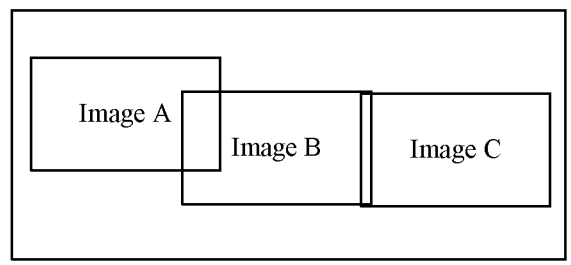
FIG. 6 is a schematic diagram of previewing 3 images in the 1×3 video stitching scene according to embodiments of the present disclosure.
FIG. 7 is a schematic diagram of positions of respective cameras in a 3×3 video stitching scene according to embodiments of the present disclosure.

Specifically, after initial mounting of the cameras is completed according to the ways shown in FIG. 4 and FIG. 5, images corresponding to the 3 cameras may be previewed in real time. FIG. 6 is a schematic diagram of previewing 3 images in the 1×3 video stitching scene according to the present disclosure. As shown in FIG. 6, image A corresponds to camera A, image B corresponds to camera B, image C corresponds to camera C, the outer box represents a large field of view, i.e., the overall surveillance scene, and image B may be selected as the reference image.

In addition, after the reference image is selected, the following process may be performed: obtaining a control parameter of a rotating mirror corresponding to the selected reference image, and controlling and adjusting respective rotating mirrors except for the rotating mirror corresponding to the selected reference image according to the obtained control parameter, the implementation of which is traditional art. The advantage of doing this is to enable an overlapped part to exist between neighboring images to facilitate subsequent adjustment.

Block 12: Based on the selected reference image, by controlling the corresponding rotating mirror to rotate, images except for the reference image among the respective images that do not meet a requirement is adjusted to meet the requirement.

In the present block, the following process may be performed for each image x which is to be adjusted (to facilitate description, image x represents an image that needs to be adjusted): determining whether image x is adjacent to the selected reference image; and if yes, then using the selected reference image as a reference image of image x, and if no, using an image that has been adjusted and is adjacent to image x as a reference image of image x; by controlling rotation of the rotating mirror corresponding to image x, adjusting the position of image x to meet the requirement.

FIG. 7 is a schematic diagram of positions of respective cameras in a 3×3 video stitching scene according to the present disclosure. Positions of cameras 1-9 are respectively shown in FIG. 7. Cameras 1-9 correspond to images 1-9 respectively. Initially, image 5 may be chosen as a reference image. Then images 2, 4, 6, and 8 may be adjusted based on image 5, image 1 may be adjusted based on image 2 or image 4 which has been adjusted, image 3 may be adjusted based on image 2 or image 6 which has been adjusted, image 7 may be adjusted based on image 4 or image 8 which has been adjusted, and image 9 may be adjusted based on image 6 or image 8 which has been adjusted. That is, an image which has been adjusted may be used as a reference image as well.

In practice, image x may be specifically adjusted in different ways as a relative position between image x and a reference image thereof varies, which will be respectively described hereafter.

1) When image x is located on the left of image y which is the reference image of image x, determine ratio A of a height of an overlapped part between image x and image y (to facilitate description, the reference image of image x is referred to as image y) to a height of the image y;

when ratio A is smaller than a first threshold and the overlapped part is on the top left of image y, then move image x downwards by controlling the rotating mirror corresponding to image x to rotate, until ratio A is larger than the first threshold;

when ratio A is smaller than the first threshold and the overlapped part is on the bottom left of image y, then move image x upwards by controlling the rotating mirror corresponding to image x to rotate, until ratio A is larger than the first threshold;

determine ratio B of a size of the overlapped part between image x and image y to a size of image y;

when ratio B is smaller than a second threshold, then move image x to the right by controlling the rotating mirror corresponding to image x to rotate, until ratio B is larger than the second threshold and smaller than a third threshold, where the third threshold is larger than the second threshold; and when ratio B is larger than the third threshold, then move image x to the left by controlling the rotating mirror corresponding to image x to rotate, until ratio B is larger than the second threshold and smaller than the third threshold.

2) When image x is located on the right of image y which is the reference image of image x, determine ratio A of a height of an overlapped part between image x and image y to a height of image y;

when ratio A is smaller than a first threshold and the overlapped part is on the top right of image y, then move image x downwards by controlling the rotating mirror corresponding to image x to rotate, until ratio A is larger than the first threshold;

when ratio A is smaller than the first threshold and the overlapped part is on the bottom right of image y, then move image x upwards by controlling the rotating mirror corresponding to image x to rotate, until ratio A is larger than the first threshold;

determine ratio B of a size of the overlapped part between image x and image y to a size of image y;

when ratio B is smaller than a second threshold, then move image x to the left by controlling the rotating mirror corresponding to image x to rotate, until ratio B is larger than the second threshold and smaller than a third threshold, where the third threshold is larger than the second threshold; and when ratio B is larger than the third threshold, then move image x to the right by controlling the rotating mirror corresponding to image x to rotate, until ratio B is larger than the second threshold and smaller than the third threshold.

3) When image x is located above image y which is the reference image of image x, determine ratio A of a width of an overlapped part between image x and image y to a width of image y;

when ratio A is smaller than a first threshold and the overlapped part is on the top left of image y, then move image x to the right by controlling the rotating mirror corresponding to image x to rotate, until ratio A is larger than the first threshold;

when ratio A is smaller than the first threshold and the overlapped part is on the top right of image y, then move image x to the left by controlling the rotating mirror corresponding to image x to rotate, until ratio A is larger than the first threshold;

determine ratio B of a size of the overlapped part between image x and image y to a size of image y;

when ratio B is smaller than a second threshold, then move image x downwards by controlling the rotating mirror corresponding to image x to rotate, until ratio B is larger than the second threshold and smaller than a third threshold, where the third threshold is larger than the second threshold; and when ratio B is larger than the third threshold, then move image x upwards by controlling the rotating mirror corresponding to image x to rotate, until ratio B is larger than the second threshold and smaller than the third threshold.

4) When image x is located below image y which is the reference image of image x, determine ratio A of a width of an overlapped part between image x and image y to a width of image y;

when ratio A is smaller than a first threshold and the overlapped part is on the bottom left of image y, then move image x to the right by controlling the rotating mirror corresponding to image x to rotate, until ratio A is larger than the first threshold;

when ratio A is smaller than the first threshold and the overlapped part is on the bottom right of image y, then move image x to the left by controlling the rotating mirror corresponding to image x to rotate, until ratio A is larger than the first threshold;

determine ratio B of a size of the overlapped part between image x and image y to a size of image y;

when ratio B is smaller than a second threshold, then move image x upwards by controlling the rotating mirror corresponding to image x to rotate, until ratio B is larger than the second threshold and smaller than a third threshold, where the third threshold is larger than the second threshold; and when ratio B is larger than the third threshold, then move image x downwards by controlling the rotating mirror corresponding to image x to rotate, until ratio B is larger than the second threshold and smaller than the third threshold.

As can be seen from 1) to 4), in practical implementations, when an image is adjusted, the image may need to be moved in the horizontal direction, i.e., to the left or to the right, or the image may need to be moved in the vertical direction, i.e., upwards or downwards, or the image may need to be moved in both the horizontal and vertical directions. When the image needs to be moved in the two directions, the image is first moved in which direction depending on actual needs. Assume that the image is moved in the horizontal direction first, and after the image is moved to a suitable position, it is moved in the vertical direction. However, when the image is moved to a suitable position in the vertical direction, it may not be suitable in the horizontal direction, and needs to be moved in the horizontal direction again. No matter how the image is moved, as long as in the end, both ratio A and ratio B meet the conditions in the formulas 1) to 4).

Specific values of the respective thresholds in the foregoing may be defined according to practical needs. For example, the value of the first threshold may be 95%, the value of the second threshold may be 20%, and the value of the third threshold may be 40%.

In addition, the following way may be used when the rotating mirror corresponding to image x is controlled to be rotated: rotate the rotating mirror corresponding to image x at a predetermined angle each time, determine whether the position of image x has met the requirement after each rotation, and if a determination is yes, then stop rotating, or otherwise, continue to rotate.

For example, in way 1), ratio B is smaller than the second threshold. After the rotating mirror corresponding to image x is controlled to rotate at the predetermined angle, if ratio B is still determined to be smaller than the second threshold, then the rotating mirror corresponding to image x may be controlled to rotate at the predetermined angle again, and then if ratio B is larger than the second threshold and smaller than the third threshold, then rotating stops, or otherwise, the rotating mirror corresponding to image x may be controlled to rotate a predetermined angle again.

Take a 1×3 video stitching scene as an example. As described in the foregoing, image B shown in FIG. 6 is selected as the reference image.

As shown in FIG. 6, there is a certain difference between heights of image A and image B, and therefore, image A needs to be adjusted. Assume that the height of image B is 1080 pixels, and after analysis, the height of the overlapped part between image A and image B is 700 pixels, 700/1080<95%. Further, after the analysis, it can be known that image A is higher than image B. Accordingly, the rotating mirror corresponding to image A may be controlled to rotate downwards to lower the field of view of image A, i.e., moving image A downwards, and image A may be lowered gradually, until the height of the overlapped part is equal to or larger than 1080×95%.

Figure 8:
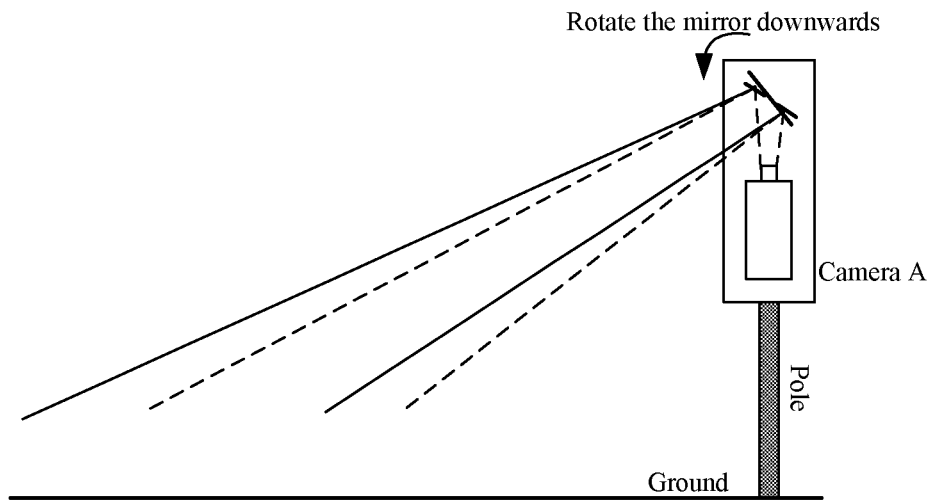
FIG. 8 is a schematic diagram of a way of adjusting a rotating mirror corresponding to camera A and a field of view change before and after the rotating mirror is adjusted in a 1×3 video stitching scene according to embodiments of the present disclosure.

FIG. 8 is a schematic diagram of a way of adjusting a rotating mirror corresponding to camera A and a field of view change before and after the rotating mirror is adjusted in a 1×3 video stitching scene according to embodiments of the present disclosure. As shown in FIG. 8, the rotating mirror is rotated downwards. The solid line indicates a field of view before the adjustment, and the dashed line indicates a field of view after the adjustment.

For two images on or almost on a same horizontal line, there are only 4 possibilities in the horizontal direction, i.e., having no overlapped part, the overlapped part being too little, the overlapped part being too much, and the overlapped part being suitable. For example, the overlapped part is considered to be too little when the overlapped part<20%, the overlapped part is considered to be suitable when 20%<the overlapped part<40% and, the overlapped part is considered to be too much when the overlapped part is larger than 40%.

Figure 9:
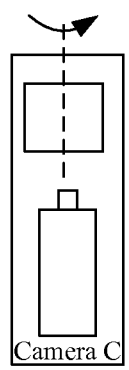
FIG. 9 is a schematic diagram of a way of adjusting a rotating mirror corresponding to camera C in a 1×3 video stitching scene according to embodiments of the present disclosure.

Assume that after adjustment in the vertical direction, the overlapped part between image A and image B is suitable, and image C and image B are on a same horizontal line, i.e., image C needs not to be adjusted in the vertical direction, but the overlapped part between image C and image B<20%, and therefore, image C needs to be adjusted in the horizontal direction. FIG. 9 is a schematic diagram of the way of adjusting a rotating mirror corresponding to camera C in a 1×3 video stitching scene according to embodiments of the present disclosure. As shown in FIG. 9, the rotating mirror may be controlled to rotate in an anticlockwise direction along a center axis thereof, so that image C is moved to the left, until the overlapped part between image C and image B is suitable.

Figure 10:
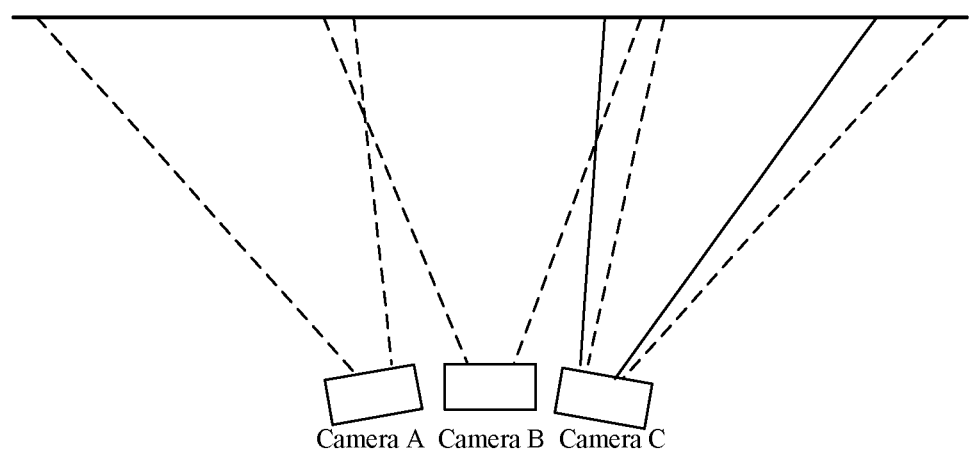
FIG. 10 is a schematic diagram of a field of view change before and after a rotating mirror corresponding to camera C is adjusted in a 1×3 video stitching scene according to embodiments of the present disclosure.

FIG. 10 is a schematic diagram of a field of view change before and after a rotating mirror corresponding to camera C is adjusted in a 1×3 video stitching scene according to embodiments of the present disclosure. As shown in FIG. 10, the dashed line represents a field of view before adjustment, and the solid line represents a view after adjustment.

Figure 11:
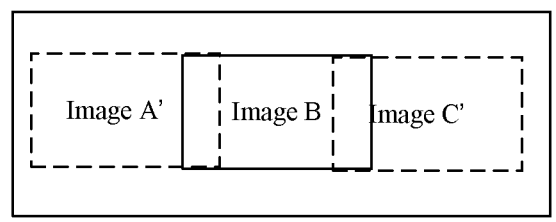
FIG. 11 is a schematic diagram of 3 images after adjustment in the 1×3 video stitching scene according to embodiments of the present disclosure.

Accordingly, FIG. 11 is a schematic diagram of 3 images after the adjustment in the 1×3 video stitching scene. As shown in FIG. 11, image A' represents image A after adjustment, and image C' represents image C after adjustment. It can be seen that image A', image B, and image C' meet the requirement of video stitching.

In practical implementations, if camera D is added on the left of camera A, and camera E is added on the right of camera C, i.e., the 1×3 video stitching scene being changed to 1×5 video stitching scene, then image A' may be used as a reference image of image D to adjust image D, and image C' is used as a reference image of image E to adjust image E.

Block 13: video stitching is performed according to an adjustment result.

The specific implementation of the present block is traditional art and will not be elaborated herein.

Figure 12:
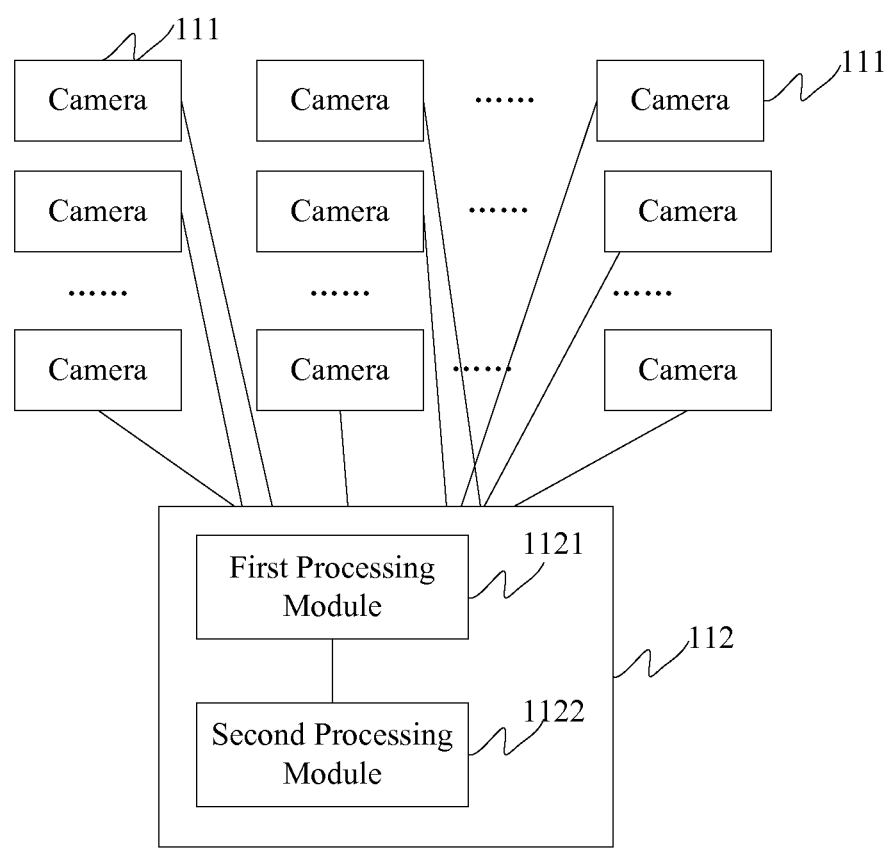
FIG. 12 is a schematic diagram of an exemplary structure of a system for video stitching according to embodiments of the present disclosure.

Based on the forgoing description, the present disclosure discloses a system for video stitching. FIG. 12 is a schematic diagram of an exemplary structure of a system for video stitching according to embodiments of the present disclosure. As shown in FIG. 12, the system includes: M×N cameras 111 and a remote control apparatus 112; where both M and N are positive integers, at least one of M and N is larger than 1, and a rotating mirror is set in front of a camera lens of each camera.

The remote control apparatus 112 is configured to, after initial mounting of cameras 111 in the M×N video stitching scene is determined to be completed, select a reference image from M×N images corresponding to M×N cameras 111; adjust an image whose position does not meet a requirement among respective images except for the selected reference image by controlling a rotating mirror corresponding to the image to rotate according to the selected reference image; and perform video stitching according to an adjustment result.

Specifically, the remote control apparatus 112 may include:

a first processing module 1121 configured to, after the initial mounting of the cameras in the M×N video stitching scene is determined to be completed, select the reference image from the M×N images corresponding to the M×N cameras, and notify a second processing module 1122; and the second module 1122 configured to, perform the following process for each image x which is to be adjusted: determining whether image x is adjacent to the selected reference image; when image x is adjacent to the selected reference image, then using the selected reference image as a reference image of image x, and when image x is not adjacent to the selected reference image, then using an image which has been adjusted and is adjacent to image x as a reference image of image x; adjusting a position of image x to meet the requirement by controlling a rotating mirror corresponding to image x to rotate according to the reference image of image x; and performing the video stitching according to an adjustment result.

In addition, the first processing module 1121 may be further configured to, after select the reference image, obtain a control parameter of a rotating mirror corresponding to the selected reference image, and control and adjust respective rotating mirrors except for a rotating mirror corresponding to the selected reference image according to the obtained control parameter.

Specifically, when image x is located on the left of an image y which is the reference image of image x, the second processing module 1122 determines a ratio A of a height of an overlapped part between image x and image y to a height of image y; when ratio A is smaller than a first threshold and the overlapped part is on the top left of image y, then moves image x downwards by controlling the rotating mirror corresponding to image x to rotate, until ratio A is larger than the first threshold; when ratio A is smaller than the first threshold and the overlapped part is on the bottom left of image y, then moves image x upwards by controlling the rotating mirror corresponding to image x to rotate, until ratio A is larger than the first threshold; and the second processing module 1122 determines a ratio B of a size of the overlapped part between image x and image y to a size of image y; when ratio B is smaller than a second threshold, then moves image x to the right by controlling the rotating mirror corresponding to image x to rotate, until ratio B is larger than the second threshold and smaller than a third threshold, where the third threshold is larger than the second threshold; and when ratio B is larger than the third threshold, then moves image x to the left by controlling the rotating mirror corresponding to image x to rotate, until ratio B is larger than the second threshold and smaller than the third threshold.

When image x is located on the right of an image y which is the reference image of image x, the second processing module 1122 determines a ratio A of a height of an overlapped part between image x and image y to a height of image y; when ratio A is smaller than a first threshold and the overlapped part is on the top right of image y, then moves image x downwards by controlling the rotating mirror corresponding to image x to rotate, until ratio A is larger than the first threshold; when ratio A is smaller than the first threshold and the overlapped part is on the bottom right of image y, then moves image x upwards by controlling the rotating mirror corresponding to image x to rotate, until ratio A is larger than the first threshold; and the second processing module 1122 determines a ratio B of a size of the overlapped part between image x and image y to a size of image y; when ratio B is smaller than a second threshold, then moves image x to the left by controlling the rotating mirror corresponding to image x to rotate, until ratio B is larger than the second threshold and smaller than a third threshold, where the third threshold is larger than the second threshold; and when ratio B is larger than the third threshold, then moves image x to the right by controlling the rotating mirror corresponding to image x to rotate, until ratio B is larger than the second threshold and smaller than the third threshold.

When image x is located above an image y which is the reference image of image x,
the second processing module 1122 determines a ratio A of a width of an overlapped part between image x and image y to a width of image y; when ratio A is smaller than a first threshold and the overlapped part is on the top left of image y, then moves image x to the right by controlling the rotating mirror corresponding to image x to rotate, until ratio A is larger than the first threshold; and when ratio A is smaller than the first threshold and the overlapped part is on the top right of image y, then moves image x to the left by controlling the rotating mirror corresponding to image x to rotate, until ratio A is larger than the first threshold; and
the second processing module 1122 determines a ratio B of a size of the overlapped part between image x and image y to a size of image y; when ratio B is smaller than a second threshold, then moves image x downwards by controlling the rotating mirror corresponding to image x to rotate, until ratio B is larger than the second threshold and smaller than a third threshold, where the third threshold is larger than the second threshold; and when ratio B is larger than the third threshold, then moves image x upwards by controlling the rotating mirror corresponding to image x to rotate, until ratio B is larger than the second threshold and smaller than the third threshold.

When image x is located below an image y which is the reference image of image x,
the second processing module 1122 determines a ratio A of a width of an overlapped part between image x and image y to a width of image y; when ratio A is smaller than a first threshold and the overlapped part is on the bottom left of image y, then moves image x to the right by controlling the rotating mirror corresponding to image x to rotate, until ratio A is larger than the first threshold; and when ratio A is smaller than the first threshold and the overlapped part is on the bottom right of image y, then moves image x to the left by controlling the rotating mirror corresponding to image x to rotate, until ratio A is larger than the first threshold; and
the second processing 1122 determines a ratio B of a size of the overlapped part between image x and image y to a size of image y; when ratio B is smaller than a second threshold, then moves image x upwards by controlling the rotating mirror corresponding to image x to rotate, until ratio B is larger than the second threshold and smaller than a third threshold, where the third threshold is larger than the second threshold; and when ratio B is larger than the third threshold, then moves image x downwards by controlling the rotating mirror corresponding to image x to rotate, until ratio B is larger than the second threshold and smaller than the third threshold.

The technical solutions in the above embodiments may be implemented through software with a necessary hardware platform, and of course, may be implemented only through hardware. However, in most cases, the former one is preferred. Based on the understanding, the remote control apparatus in the present disclosure may be embodied as a software product, which is stored on a storage medium and includes a number of instructions to make a computing device (may be a personal computer, a server, a network device, etc.) execute the methods in the embodiments.

A person of skills in the art may understand the modules in the apparatus in the embodiments may be distributed in apparatus instances, or may be modified accordingly to be located in one or more apparatus different from the present instance. The modules in the instance may be integrated into one module, or may be separated into multiple sub-modules.

Based on the technical solutions provided by the respective instances, herein a machine readable storage medium is provided to store instructions which enable a machine to execute the method for video stitching as described herein. Specifically, a system or an apparatus provided with a storage medium may be provided. On the storage medium, software program code to carry out the function in any of the embodiments is stored, so that a computer (or CPU or MPU) of the system or apparatus reads and executes the program code stored on the storage medium.

In this case, the program code per se read from the storage medium may carry out a part of or all of the functions in any of the instances, and thus the program code and the storage medium that stores the program code constitute a part of the video image storage technical solution.

The storage medium for providing the program code may be a floppy disk, a hard disk, a magnetic and optical disc, an optical disc (such as a CD-ROM, a CD-R, a CD-RW, a DVD-ROM, a DVD-RAM, a DVD-RW, or a DVD+RW), a magnetic disk, a flash memory card, an ROM, or the like. Optionally, the program code may also be downloaded from a server through a communications network.

In addition, it may be understood that an operating system operating on a computer may carry out a part of or all of the actual operations so as to carry out the function in any of embodiments of the foregoing instances not only by executing program code read out by the computer but also by executing instructions based on the program code.

In addition, the program codes stored on the storage medium are written into a memory. The memory is located in an extension board plugged into a computer or in an extension unit connected with the computer. In an embodiment, based on the instructions, a CPU on the extension board or on the extension unit executes at least a part of the operations so as to carry out the technical solution in any of the foregoing embodiments.

For example, the remote control apparatus 112 in the system for video stitching according to the embodiments of the present disclosure may include: memory, and a processor that is in communication with the memory. On the memory, computer executable instructions that can be executed by the processor are stored. The computer executable instructions may include a first processing module instruction and a second processing module instruction which are configured to instruct the processor to execute the functions of the first processing module 1121 and the second processing module 1122 shown in FIG. 12.

The foregoing descriptions are merely preferred embodiments of the present application, but are not intended to limit the present application. Any modification, equivalent replacement, or improvement made within the spirit and principle of the present application shall fall within the protection scope of the present application.

What is claimed is:
1. A method for video stitching, the method comprising:
selecting a reference image from M×N images corresponding to M×N cameras in a M×N video stitching scene; where both M and N are positive integers, at least one of M and N is larger than 1, and a rotating mirror is set in front of a camera lens of each camera;

adjusting a position of an image whose position does not meet a requirement of seamless stitching among respective images except for the selected reference image by controlling a rotating mirror corresponding to the image to rotate according to the selected reference image; and performing video stitching;

wherein the adjusting an image whose position does not meet a requirement among respective images except for the selected reference image by controlling a rotating mirror corresponding to the image to rotate according to the selected reference image comprises:

for each image x which is to be adjusted, performing:

determining whether the image x is adjacent to the selected reference image;

when the image x is adjacent to the selected reference image, then using the selected reference image as a reference image of the image x, and when the image x is not adjacent to the selected reference image, then using an image which has been adjusted and is adjacent to the image x as a reference image of the image x; and adjusting the image x to meet the requirement by controlling a rotating mirror corresponding to the image x to rotate according to the reference image of the image x.

2. The method of claim 1, wherein after selecting the reference image, the method further comprises: obtaining a control parameter of a rotating mirror corresponding to the selected reference image, and controlling and adjusting respective mirrors except for the rotating mirror corresponding to the selected reference image according to the obtained control parameter.

3. The method of claim 1, wherein the adjusting the image x to meet the requirement by controlling a rotating mirror corresponding to the image x to rotate according to the reference image of the image x comprises:

when the image x is located on the left of an image y which is the reference image of the image x, determining a ratio A of a height of an overlapped part between the image x and the image y to a height of the image y;

when the ratio A is smaller than a first threshold and the overlapped part is on the top left of the image y, then moving the image x downwards by controlling the rotating mirror corresponding to the image x to rotate, until the ratio A is larger than the first threshold;

when the ratio A is smaller than the first threshold and the overlapped part is on the bottom left of the image y, then moving the image x upwards by controlling the rotating mirror corresponding to the image x to rotate, until the ratio A is larger than the first threshold;

determining a ratio B of a size of the overlapped part between the image x and the image y to a size of the image y;

when the ratio B is smaller than a second threshold, then moving the image x to the right by controlling the rotating mirror corresponding to the image x to rotate, until the ratio B is larger than the second threshold and smaller than a third threshold, where the third threshold is larger than the second threshold; and when the ratio B is larger than the third threshold, then moving the image x to the left by controlling the rotating mirror corresponding to the image x to rotate, until the ratio B is larger than the second threshold and smaller than the third threshold.

4. The method of claim 1, wherein the adjusting the image x to meet the requirement by controlling a rotating mirror corresponding to the image x to rotate according to the reference image of the image x comprises:

when the image x is located on the right of an image y which is the reference image of the image x, determining a ratio A of a height of an overlapped part between the image x and the image y to a height of the image y;

when the ratio A is smaller than a first threshold and the overlapped part is on the top right of the image y, then moving the image x downwards by controlling the rotating mirror corresponding to the image x to rotate, until the ratio A is larger than the first threshold;

when the ratio A is smaller than the first threshold and the overlapped part is on the bottom right of the image y, then moving the image x upwards by controlling the rotating mirror corresponding to the image x to rotate, until the ratio A is larger than the first threshold;

determining a ratio B of a size of the overlapped part between the image x and the image y to a size of the image y;

when the ratio B is smaller than a second threshold, then moving the image x to the left by controlling the rotating mirror corresponding to the image x to rotate, until the ratio B is larger than the second threshold and smaller than a third threshold, where the third threshold is larger than the second threshold; and when the ratio B is larger than the third threshold, then moving the image x to the right by controlling the rotating mirror corresponding to the image x to rotate, until the ratio B is larger than the second threshold and smaller than the third threshold.

5. The method of claim 1, wherein the adjusting the image x to meet the requirement by controlling a rotating mirror corresponding to the image x to rotate according to the reference image of the image x comprises:

when the image x is located above an image y which is the reference image of the image x, determining a ratio A of a width of an overlapped part between the image x and the image y to a width of the image y;

when the ratio A is smaller than a first threshold and the overlapped part is on the top left of the image y, then moving the image x to the right by controlling the rotating mirror corresponding to the image x to rotate, until the ratio A is larger than the first threshold;

when the ratio A is smaller than the first threshold and the overlapped part is on the top right of the image y, then moving the image x to the left by controlling the rotating mirror corresponding to the image x to rotate, until the ratio A is larger than the first threshold;

determining a ratio B of a size of the overlapped part between the image x and the image y to a size of the image y;

when the ratio B is smaller than a second threshold, then moving the image x downwards by controlling the rotating mirror corresponding to the image x to rotate, until the ratio B is larger than the second threshold and smaller than a third threshold, where the third threshold is larger than the second threshold; and when the ratio B is larger than the third threshold, then moving the image x upwards by controlling the rotating mirror corresponding to the image x to rotate, until the ratio B is larger than the second threshold and smaller than the third threshold.

6. The method of claim 1, wherein
the adjusting the image x to meet the requirement by controlling a rotating mirror corresponding to the image x to rotate according to the reference image of the image x comprises:
when the image x is located below an image y which is the reference image of the image x,
determining a ratio A of a width of an overlapped part between the image x and the image y to a width of the image y;
when the ratio A is smaller than a first threshold and the overlapped part is on the bottom left of the image y, then moving the image x to the right by controlling the rotating mirror corresponding to the image x to rotate, until the ratio A is larger than the first threshold;
when the ratio A is smaller than the first threshold and the overlapped part is on the bottom right of the image y, then moving the image x to the left by controlling the rotating mirror corresponding to the image x to rotate, until the ratio A is larger than the first threshold;
determining a ratio B of a size of the overlapped part between the image x and the image y to a size of the image y;
when the ratio B is smaller than a second threshold, then moving the image x upwards by controlling the rotating mirror corresponding to the image x to rotate, until the ratio B is larger than the second threshold and smaller than a third threshold, where the third threshold is larger than the second threshold; and
when the ratio B is larger than the third threshold, then moving the image x downwards by controlling the rotating mirror corresponding to the image x to rotate, until the ratio B is larger than the second threshold and smaller than the third threshold.

7. The method of claim 3, wherein
controlling the rotating mirror corresponding to the image x to rotate comprises: rotating the rotating mirror corresponding to the image x at a predetermined angle each time, determining whether the image x has met the requirement after each rotation, and if a determination is yes, then stopping rotating, or otherwise, continuing to rotate.

8. A system for video stitching, the system comprising:
M×N cameras and a remote control apparatus; where both M and N are positive integers, at least one of M and N is larger than 1, and a rotating mirror is set in front of a camera lens of each camera; and
the remote control apparatus is configured to select a reference image from M×N images corresponding to the M×N cameras in a M×N video stitching scene; adjust a position of an image whose position does not meet a requirement of seamless stitching among respective images except for the selected reference image by controlling a rotating mirror corresponding to the image to rotate according to the selected reference image; and perform video stitching;
wherein
the remote control apparatus comprises:
a first processing module configured to select the reference image from the M×N images corresponding to the M×N cameras in the M×N video stitching scene, and notify a second processing module; and
the second processing module configured to perform the following process for each image x which is to be adjusted: determining whether the image x is adjacent to the selected reference image; when the image x is adjacent to the selected reference image, then using the selected reference image as a reference image of the image x, and when the image x is not adjacent to the selected reference image, then using an image which has been adjusted and is adjacent to the image x as a reference image of the image x; adjusting a position of the image x to meet the requirement by controlling a rotating mirror corresponding to the image x to rotate according to the reference image of the image x; and performing the video stitching according to an adjustment result.

9. The system of claim 8, wherein
the first processing module is further configured to, after select the reference image, obtain a control parameter of a rotating mirror corresponding to the selected reference image, and control and adjust respective rotating mirrors except for a rotating mirror corresponding to the selected reference image according to the obtained control parameter.

10. The system of claim 8, wherein
when the image x is located on the left of an image y which is the reference image of the image x,
the second processing module is configured to determine a ratio A of a height of an overlapped part between the image x and the image y to a height of the image y; when the ratio A is smaller than a first threshold and the overlapped part is on the top left of the image y, then move the image x downwards by controlling the rotating mirror corresponding to the image x to rotate, until the ratio A is larger than the first threshold; when the ratio A is smaller than the first threshold and the overlapped part is on the bottom left of the image y, then move the image x upwards by controlling the rotating mirror corresponding to the image x to rotate, until the ratio A is larger than the first threshold; and
the second processing module is configured to determine a ratio B of a size of the overlapped part between the image x and the image y to a size of the image y; when the ratio B is smaller than a second threshold, then move the image x to the right by controlling the rotating mirror corresponding to the image x to rotate, until the ratio B is larger than the second threshold and smaller than a third threshold, where the third threshold is larger than the second threshold; and when the ratio B is larger than the third threshold, then move the image x to the left by controlling the rotating mirror corresponding to the image x to rotate, until the ratio B is larger than the second threshold and smaller than the third threshold.

11. The system of claim 8, wherein
when the image x is located on the right of an image y which is the reference image of the image x,
the second processing module is configured to determine a ratio A of a height of an overlapped part between the image x and the image y to a height of the image y; when the ratio A is smaller than a first threshold and the overlapped part is on the top right of the image y, then move the image x downwards by controlling the rotating mirror corresponding to the image x to rotate, until the ratio A is larger than the first threshold; when the ratio A is smaller than the first threshold and the overlapped part is on the bottom right of the image y, then move the image x upwards by controlling the rotating mirror corresponding to the image x to rotate, until the ratio A is larger than the first threshold; and the second processing module is configured to determine a ratio B of a size of the overlapped part between the image x and the image y to a size of the image y; when the ratio B is smaller than a second threshold, then move the image x to the left by controlling the rotating mirror corresponding to the image x to rotate, until the ratio B is larger than the second threshold and smaller than a third threshold, where the third threshold is larger than the second threshold; and when the ratio B is larger than the third threshold, then move the image x to the right by controlling the rotating mirror corresponding to the image x to rotate, until the ratio B is larger than the second threshold and smaller than the third threshold.

12. The system of claim 8, wherein when the image x is located above an image y which is the reference image of the image x, the second processing module is configured to determine a ratio A of a width of an overlapped part between the image x and the image y to a width of the image y; when the ratio A is smaller than a first threshold and the overlapped part is on the top left of the image y, then move the image x to the right by controlling the rotating mirror corresponding to the image x to rotate, until the ratio A is larger than the first threshold; and when the ratio A is smaller than the first threshold and the overlapped part is on the top right of the image y, then move the image x to the left by controlling the rotating mirror corresponding to the image x to rotate, until the ratio A is larger than the first threshold; and the second processing module is configured to determine a ratio B of a size of the overlapped part between the image x and the image y to a size of the image y; when the ratio B is smaller than a second threshold, then move the image x downwards by controlling the rotating mirror corresponding to the image x to rotate, until the ratio B is larger than the second threshold and smaller than a third threshold, where the third threshold is larger than the second threshold; and when the ratio B is larger than the third threshold, then move the image x upwards by controlling the rotating mirror corresponding to the image x to rotate, until the ratio B is larger than the second threshold and smaller than the third threshold.

13. The system of claim 8, wherein when the image x is located below an image y which is the reference image of the image x, the second processing module is configured to determine a ratio A of a width of an overlapped part between the image x and the image y to a width of the image y; when the ratio A is smaller than a first threshold and the overlapped part is on the bottom left of the image y, then move the image x to the right by controlling the rotating mirror corresponding to the image x to rotate, until the ratio A is larger than the first threshold; and when the ratio A is smaller than the first threshold and the overlapped part is on the bottom right of the image y, then move the image x to the left by controlling the rotating mirror corresponding to the image x to rotate, until the ratio A is larger than the first threshold; and the second processing is configured to determine a ratio B of a size of the overlapped part between the image x and the image y to a size of the image y; when the ratio B is smaller than a second threshold, then move the image x upwards by controlling the rotating mirror corresponding to the image x to rotate, until the ratio B is larger than the second threshold and smaller than a third threshold, where the third threshold is larger than the second threshold; and when the ratio B is larger than the third threshold, then move the image x downwards by controlling the rotating mirror corresponding to the image x to rotate, until the ratio B is larger than the second threshold and smaller than the third threshold.

14. A non-transitory computer readable storage medium storing one or more programs executable by a computer system, the one or more programs comprising instructions to:

select a reference image from M×N images corresponding to M×N cameras in a M×N video stitching scene; where both M and N are positive integers, at least one of M and N is larger than 1, and a rotating mirror is set in front of a camera lens of each camera;

adjust a position of an image whose position does not meet a requirement of seamless stitching among respective images except for the selected reference image by controlling a rotating mirror corresponding to the image to rotate according to the selected reference image; and perform video stitching;

wherein the adjusting an image whose position does not meet a requirement among respective images except for the selected reference image by controlling a rotating mirror corresponding to the image to rotate according to the selected reference image comprises:

for each image x which is to be adjusted, performing:

determining whether the image x is adjacent to the selected reference image;

when the image x is adjacent to the selected reference image, then using the selected reference image as a reference image of the image x, and when the image x is not adjacent to the selected reference image, then using an image which has been adjusted and is adjacent to the image x as a reference image of the image x; and adjusting the image x to meet the requirement by controlling a rotating mirror corresponding to the image x to rotate according to the reference image of the image x.

* * * * *